US012309455B2

(12) United States Patent
Pattison et al.

(10) Patent No.: US 12,309,455 B2
(45) Date of Patent: *May 20, 2025

(54) FORCED UPDATE OF META-PROGRAMMING DATA USING DIGITAL VIDEO BROADCAST SERVICE INFORMATION

(71) Applicant: DISH Network L.L.C., Englewood, CO (US)

(72) Inventors: Alan Terry Pattison, Castle Rock, CO (US); Danny J. Minnick, Castle Rock, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,206

(22) Filed: Oct. 16, 2023

(65) Prior Publication Data

US 2024/0040195 A1    Feb. 1, 2024

Related U.S. Application Data

(63) Continuation of application No. 17/216,963, filed on Mar. 30, 2021, now Pat. No. 11,825,163.

(51) Int. Cl.
*H04N 21/462* (2011.01)
*G06F 16/242* (2019.01)
(Continued)

(52) U.S. Cl.
CPC ....... *H04N 21/462* (2013.01); *G06F 16/2428* (2019.01); *G06F 16/245* (2019.01);
(Continued)

(58) Field of Classification Search
CPC ............ H04N 21/462; H04N 21/4586; H04N 21/472; G06F 16/245; G06F 16/2428; G06F 16/248
See application file for complete search history.

(56) References Cited

U.S. PATENT DOCUMENTS 10,171,849 B1    1/2019    Hwang et al.
10,417,272 B1    9/2019    Carmack et al.
(Continued)

*Primary Examiner* — Jefferey F Harold
*Assistant Examiner* — Franklin S Andramuno
(74) *Attorney, Agent, or Firm* — Kilpatrick Townsend & Stockton LLP

(57) ABSTRACT

Embodiments detect updates to digital video broadcast (DVB) service information (SI), and forcing off-schedule updates to local meta-programming data (MPD) of a customer premises appliance in response to the update, where appropriate. For example, embodiments detect an SI update for at least one DVB content service being provided via a DVB network and determine whether a stream update descriptor in the SI is asserted. Detected assertion triggers an automatic off-schedule MPD update, including assigning a tuner to obtain updated provider MPD via an MPD service, and rebuilding local MPD based on the updated provider MPD. The local MPD is usable by the customer premises appliance to populate a meta-programming user interface (e.g., an electronic program guide) by which to display descriptive information about at least some of the plurality of DVB content services.

20 Claims, 6 Drawing Sheets

(51) Int. Cl.
*G06F 16/245* (2019.01)
*G06F 16/248* (2019.01)
*H04N 21/458* (2011.01)
*H04N 21/472* (2011.01)

(52) U.S. Cl.
CPC ....... *G06F 16/248* (2019.01); *H04N 21/4586* (2013.01); *H04N 21/472* (2013.01)

(56) References Cited

U.S. PATENT DOCUMENTS

| | | |
|---|---|---|
| 10,736,005 B1 | 8/2020 | Govindassamy |
| 2006/0020988 A1 | 1/2006 | Takagi et al. |
| 2006/0253876 A1 | 11/2006 | Hsu |
| 2009/0239557 A1 | 9/2009 | Kadakia et al. |
| 2014/0186012 A1 | 7/2014 | Beals |
| 2017/0085940 A1 | 3/2017 | Innes et al. |
| 2018/0026733 A1 | 1/2018 | Yang et al. |
| 2024/0163514 A1* | 5/2024 | Park .................... H04N 21/462 |

* cited by examiner

FORCED UPDATE OF META-PROGRAMMING DATA USING DIGITAL VIDEO BROADCAST SERVICE INFORMATION

CROSS REFERENCE TO RELATED APPLICATIONS

This application is a continuation of U.S. Non-Provisional patent application Ser. No. 17/216,963, filed on Mar. 30, 2021, which is incorporated by reference for all purposes.

FIELD

The present disclosure relates in general to digital video broadcast interactions, and, more specifically, but not by way of limitation, to forcing automatic updates of meta-programming data using digital video broadcast service information.

BACKGROUND

Broadcast programming is typically received at a customer premises via a television receiver. The television receiver can be implemented within any suitable appliance or set of appliances, such as in or with a set-top box (STB), a network router, a television, etc. In general, the television receiver receives broadcast television content, and/or other audio/video data via one or more provider networks, such as via a satellite broadcast network, a terrestrial cable broadcast network, etc. With regard to digital video broadcast (DVB) environments, the television receiver can typically receive DVB programming via multiple content streams. For example, a particular content stream may correspond to audio/video data for a particular linear broadcast channel encoded in a particular manner (e.g., according to a bit rate, resolution, etc.), and the particular content stream may be assigned for a particular user or group of users to a particular broadcast frequency, television channels, etc.

In addition to receiving the audio/video content, the television receiver can receive (e.g., via the same networks and/or different networks, such as over the Internet) service information (SI). The SI can generally include any suitable types of descriptive information about the content streams being provided via the provider networks. Some such SI includes data referred to herein as "meta-programming data," or "MPD." The MPD can generally include user-facing descriptive information, such as information used to build and populate electronic program guide (EPG) interfaces and/or search interfaces for display to users. Other such SI can include receiver-facing information, such as various data tables, or other data used by the television receiver to provide DVB content to the user. In some embodiments, the television receiver obtains and decodes provider SI (e.g., a global version of the SI) via the provider network, and processes the provider SI to build local SI based on local parameters, such as user credentials, subscription access, parental controls, features of the television receiver, configuration of a local network, etc. After being decoded and/or locally built, the SI can may be stored in a memory local to the television receiver (e.g., in storage on-board the television receiver and/or separate from, but accessible to the television receiver), such as a DRAM, a hard disk drive, or other suitable data storage. For example, the television receiver builds local data tables, and uses the local tables to obtain and build local MPD for subsequently populating EPG, search, and/or other user interfaces.

Each time a television receiver updates its local MPD (e.g., EPG, search, and/or other information), it may do so by assigning a tuner to tune to a particular channel via which it can receive updated MPD from the provider network. As the television receiver typically has a limited number of tuners (e.g., only one, or a small number), it may be desirable to schedule and limit such updates so as to avoid interfering with a user's ability to watch television content, record television content, and/or perform other actions that also use tuners of the television receiver. As such, some television receivers are configured to update MPD (and/or other SI) in accordance with a predefined schedule. For example, because linear programming schedules for broadcast content streams tend to be known well in advance and tend not to change very much, some television receivers are configured to obtain EPG information only once per day, and the obtained information can include a number of days' worth of scheduling information (e.g., for the upcoming nine days).

However, there can be situations in which MPD for a particular timeframe changes between scheduled updates. For example, a live-televised sporting or concert event may be delayed or rescheduled, due to unpredicted changes in weather conditions, health or fitness of participants, emergency broadcasts, etc. For impacted content streams, such unpredicted event and/or stream changes can conflict with corresponding information being provided to users via EPG, search, and/or other interfaces populated by the television receiver. In such cases, conventionally, the correct (updated) information may not be populated by the television receivers to the user interfaces until after a next scheduled MPD update, which may occur only after the affected timeframe has passed.

SUMMARY

Embodiments relate to detecting updates to digital video broadcast (DVB) service information (SI), and forcing off-schedule updates to local meta-programming data (MPD) of a customer premises appliance in response to the update, where appropriate. For example, embodiments detect an SI update for at least one DVB content service being provided via a DVB network and determine whether a stream update descriptor in the SI is asserted. Detected assertion triggers an automatic off-schedule MPD update, including assigning a tuner to obtain updated provider MPD via an MPD service, and rebuilding local MPD based on the updated provider MPD. The local MPD is usable by the customer premises appliance to populate a meta-programming user interface (e.g., an electronic program guide) by which to display descriptive information about at least some of the plurality of DVB content services.

According to one set of embodiments, a method is provided for forcing automatic updating of meta-programming data using digital video broadcast (DVB) service information (SI). The method includes: detecting, by a customer premises appliance, an update to SI for at least one DVB content service of a plurality of DVB content services provided to the customer premises appliance via one or more DVB networks, the SI comprising a stream update descriptor; determining, by the customer premises appliance, that the stream update descriptor is asserted; and executing, by the customer premises appliance automatically responsive to the determining, an off-schedule meta-programming data (MPD) update at least by: assigning a tuner of the customer premises appliance to obtain updated provider MPD via an MPD service of the plurality of DVB content services; and rebuilding local MPD based on the updated provider MPD, the local MPD stored local to the customer premises appliance and usable by the customer premises appliance to populate a meta-programming user interface by which to display descriptive information about at least some of the plurality of DVB content services.

According to another set of embodiments, a customer premises appliance is provided. The customer premises appliance includes: one or more tuners to be selectively tuned to any of a plurality of channels, each corresponding to a respective digital video broadcast (DVB) content service of a plurality of DVB content services provided via one or more DVB networks; one or more processors; and a non-transient storage subsystem. The storage subsystem has, stored thereon: local meta-programming data (MPD) usable by the customer premises appliance to populate a meta-programming user interface by which to display descriptive information about at least some of the plurality of DVB content services; and processor-readable instructions. The instructions, when executed by the one or more processors, cause the one or more processor to perform steps comprising: detecting an update to SI for at least one DVB content service of a plurality of DVB content services provided to the customer premises appliance via one or more DVB networks, the SI comprising a stream update descriptor; determining that the stream update descriptor is asserted; and executing, automatically responsive to the determining, an off-schedule MPD update at least by assigning a tuner of the one or more tuners to obtain updated provider MPD via an MPD service of the plurality of DVB content services, and rebuilding local MPD based on the updated provider MPD.

According to another set of embodiments, another method is provided for forcing automatic updating of meta-programming data using digital video broadcast (DVB) service information (SI). The method includes: detecting, by a provider-side node of a DVB services provider, an update to at least one DVB content service of a plurality of DVB content services provided to customer premises appliances by the DVB services provider via one or more DVB networks; updating, by the provider-side node responsive to the detecting, SI for the at least one DVB content service, including asserting a stream update descriptor in the SI; updating, by the provider-side node responsive to the detecting, provider meta-programming data (MPD) based on the update to the at least one DVB content service; and broadcasting the updated provider MPD via an MPD service of the plurality of DVB content services. Detection of the asserted stream update descriptor by one of the customer premises appliance upon receipt by the customer premises appliance of the updated SI forces the customer premises appliance automatically to execute an off-schedule MPD update by assigning a tuner of the customer premises appliance to obtain the updated provider MPD via the MPD service and to rebuild local MPD of the customer premises appliance based on the updated provider MPD, the local MPD usable by the customer premises appliance to populate a meta-programming user interface by which to display descriptive information about at least some of the plurality of DVB content services. Some such embodiments further include determining, by the provider-side node responsive to the detecting, a set of upcoming program event timings impacted by the update to the at least one DVB content service; and determining whether any of the set of upcoming program event timings is prior to a next pre-scheduled MPD update time, wherein the asserting the stream update descriptor in the SI is only performed in accordance with determining that at least one of the set of upcoming program event timings is prior to the next pre-scheduled MPD update time. Other such embodiments further include determining, by the provider-side node responsive to the detecting, whether a number of times the stream update descriptor has been asserted since a last pre-scheduled MPD update has reached a predetermined threshold MPD update frequency, wherein the asserting the stream update descriptor in the SI is only performed in accordance with determining that the number of times the stream update descriptor has been asserted since the last pre-scheduled MPD update has not reached a predetermined threshold MPD update frequency.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended FIGURES.

In the appended FIGURES, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the FIGURES herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
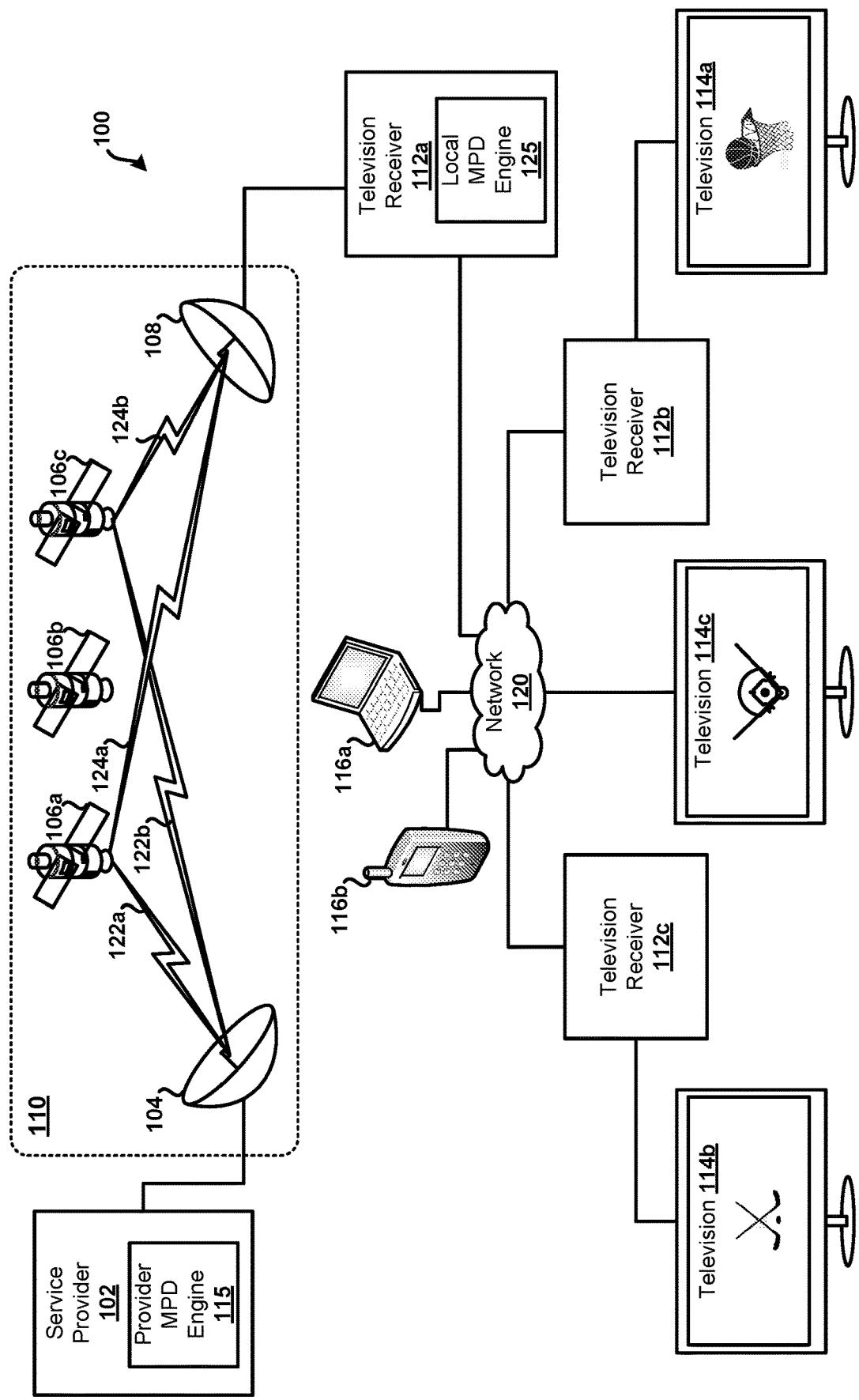
FIG. 1 shows an example media content distribution environment is shown as a context for embodiments described herein.

Turning to FIG. 1, an example media content distribution environment 100 is shown as a context for embodiments described herein. The environment 100 is depicted in a simplified and conceptual form, and may generally include more or fewer systems, devices, networks, and/or other components as desired. Further, number and type of features or elements incorporated within the environment 100 may or may not be implementation-specific. While illustrated as a satellite communications system, aspects of the environment 100 can be implemented by a cable television distribution system, an IPTV (Internet Protocol Television) content distribution system, and/or any other suitable type of media or content distribution system. The environment 100 can generally provide communications between a service provider 102 and one or more customer premises appliances 112 via a provider network 110. In FIG. 1, the customer premises appliances 112 are illustrated as "television receivers 112," though the customer premises appliances 112 can be implemented as any suitable appliance or appliances (e.g., network routers, set-top boxes (STBs), etc.). Embodiments of the provider network 110 can include any suitable components to enable a digital video broadcast (DVB) network.

In some implementations, the provider network 110 includes a provider-side satellite uplink 104, one or more satellites 106, and a customer-side satellite dish 108. Some implementations can include a single satellite 106, such as a geosynchronous satellite that illuminates a substantially consistent coverage area with one or more spot beams, or the like. Other implementations include multiple satellites 106, such as multiple non-geosynchronous, low-Earth orbit (LEO), medium-Earth orbit (MEO), and/or other satellites. The one or more satellites 106 can receive uplink signals 122 from the satellite uplink 104. In this example, the uplink signals 122 contain one or more transponder streams of particular data or content, such as a particular television channel, that is supplied by the service provider 102. For example, each of the respective uplink signals 122 contains various media content, such as multiple encoded HD (High Definition) television channels, various SD (Standard Definition) television channels, on-demand programming, programming information, and/or any other content in the form of at least one transponder stream, and in accordance with an allotted carrier frequency and bandwidth. In some implementations, different media content is carried using different ones of the satellites 106. Further, different media content can be carried using different transponders of a particular satellite 106; thus, such media content may be transmitted at different frequencies and/or different frequency ranges. For example, a first and second television channel may be carried on a first carrier frequency over a first transponder of satellite 106a, and a third, fourth, and fifth television channel may be carried on second carrier frequency over a first transponder of satellite 106b, or, the third, fourth, and fifth television channel may be carried on a second carrier frequency over a second transponder of satellite 106a, etc.

The satellites 106 may further be configured to relay the uplink signals 122 to the satellite dish 108 as downlink signals 124. Similar to the uplink signals 122, each of the downlink signals 124 may contain one or more transponder streams of particular data or content, such as various encoded and/or at least partially electronically scrambled television channels, on-demand programming, etc., in accordance with an allotted carrier frequency and bandwidth. The downlink signals 124, however, may not necessarily contain the same or similar content as a corresponding one of the uplink signals 122. For example, uplink signal 122a may include a first transponder stream containing at least a first group or grouping of television channels, and the downlink signal 124a may include a second transponder stream containing at least a second, different group or grouping of television channels. In other examples, the first and second group of television channels may have one or more television channels in common. In sum, there may be varying degrees of correlation between the uplink signals 122 and the downlink signals 124, both in terms of content and underlying characteristics.

Embodiments of the satellite dish 108 can receive television channels, such as on a subscription basis, provided by the service provider 102, satellite uplink 104, and/or satellites 106. For example, the satellite dish 108 may be configured to receive particular transponder streams, or downlink signals 124, from one or more of the satellites 106. Based on the characteristics of the customer premises appliances 112 and/or satellite dish 108, however, it may only be possible to capture transponder streams from a limited number of transponders concurrently. For example, a tuner of a particular customer premises appliance 112 may only be able to tune to a single transponder stream from a transponder of a single satellite at a time.

Additionally, a customer premises appliance 112 that is communicatively coupled to the satellite dish 108 can select (via a tuner), decode, and relay particular transponder streams to a television 114 (or other suitable display device) for display thereon. For example, the satellite dish 108 and the customer premises appliance 112a may, respectively, be configured to receive, decode, and relay at least one premium HD-formatted television channel to television 114c. Programming or content associated with the HD channel may generally be presented "live," or from a recording as previously stored on, by, or at the customer premises appliance 112a. In this example, the HD channel may be output to the television 114c in accordance with the HDMI/HDCP content protection technologies. Other embodiments are possible. For example, in some embodiments, the HD channel may be output to the television 114c in accordance with the MoCA® (Multimedia over Coax Alliance) home entertainment networking standard. Still other embodiments are possible. Further, one customer premises appliance 112 (e.g., customer premises appliance 112a) can select, decode, and relay particular transponder streams to other one or more other customer premises appliances 112 (e.g., to customer premises appliance 112b and customer premises appliance 112c), which may, in turn, relay particular transponder streams to additional customer premises appliances 112, to one or more televisions 114, to one or more computing devices 116, and/or to any other suitable output (e.g., display) devices.

The customer premises appliances 112 can be coupled with each other and/or with display devices and/or other suitable devices, such as televisions 114, computing devices 116, etc., via a local network 120. In some embodiments, the various devices and local network 120 are all disposed in a customer premises. Embodiments of the local network 120 can establish a bi-directional communication path (not shown) for data transfer among the customer premises components and/or between the local network 120 and the provider network 110. For example, at least one of the customer premises appliances 112 can include a modem, router, and/or other component to couple the local network 120 with the provider network 110. Embodiments of the local network 120 can incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, and/or any other type of communication network(s) configured such that data may be transferred between and among respective elements.

In a typical DVB environment, digital broadcast programming can be received at a customer premises via one or more of the customer premises appliances 112, such as via a television receiver. In general, the television receiver receives broadcast television content, and/or other audio/video data via one or more provider networks 110, such as via a satellite broadcast network, a terrestrial cable broadcast network, etc. The television receiver can typically receive DVB programming via multiple content streams. For example, a particular content stream may correspond to audio/video data for a particular linear broadcast channel encoded in a particular manner (e.g., according to a bit rate, resolution, etc.), and the particular content stream may be assigned for a particular user or group of users to a particular broadcast frequency, television channels, etc.

In addition to receiving the audio/video content, the television receiver can receive (e.g., via the same networks and/or different networks, such as over the Internet) service information (SI). The SI can generally include any suitable types of descriptive information about the content streams being provided via the provider networks. Some such SI includes data referred to herein as "meta-programming data," or "MPD." The MPD can generally include user-facing descriptive information, such as information used to build and populate electronic program guide (EPG) interfaces and/or search interfaces for display to users. Other such SI can include receiver-facing information, such as various data tables, or other data used by the television receiver to provide DVB content to the user.

In some embodiments, the television receiver obtains and decodes provider SI (e.g., a global version of the SI) via the provider network, and processes the provider SI to build local SI based on local parameters, such as user credentials, subscription access, parental controls, features of the television receiver, configuration of a local network, etc. After being decoded and/or locally built, the SI can may be stored in a memory local to the television receiver (e.g., in storage on-board the television receiver and/or separate from, but accessible to the television receiver), such as a DRAM, a hard disk drive, or other suitable data storage. For example, the television receiver builds local data tables, and uses the local tables to obtain and build local MPD for subsequently populating EPG, search, and/or other user interfaces.

Each time a television receiver updates its local MPD (e.g., EPG, search, and/or other information), it may do so by assigning a tuner to tune to a particular channel via which it can receive updated MPD from the provider network. As the television receiver typically has a limited number of tuners (e.g., only one, or a small number), it may be desirable to schedule and limit such updates so as to avoid interfering with a user's ability to watch television content, record television content, and/or perform other actions that also use tuners of the television receiver. As such, some television receivers are configured to update MPD (and/or other SI) in accordance with a predefined schedule. For example, because linear programming schedules for broadcast content streams tend to be known well in advance and tend not to change very much, some television receivers are configured to obtain EPG information only once per day, and the obtained information can include a number of days' worth of scheduling information (e.g., for the upcoming two days, nine days, etc.).

However, there can be situations in which MPD for a particular timeframe changes between scheduled updates. For example, a live-televised sporting or concert event may be delayed or rescheduled, due to unpredicted changes in weather conditions, health or fitness of participants, emergency broadcasts, etc. For impacted content streams, such unpredicted event and/or stream changes can conflict with corresponding information being provided to users via EPG, search, and/or other interfaces populated by the television receiver. In such cases, conventionally, the correct (updated) information may not be populated by the television receivers to the user interfaces until after a next scheduled MPD update, which may occur only after the affected timeframe has passed.

Embodiments introduce a new "stream update descriptor" into the SI that indicates to the television receiver that a timeframe of interest (TOI) update has occurred to one or more of the content streams (e.g., to the stream, to a group of related streams, to one or more events on the stream, etc.). The TOI is configured as a relevant timeframe for which it is deemed desirable to inform a user of any stream update occurring within that timeframe. In some implementations, the TOI is configured as the timeframe between a present time and a next scheduled MPD update. For example, if it is presently noon, and the television receiver is configured to automatically update its local MPD each morning at 04:00, the TOI can be the upcoming 16 hours; and any stream changes occurring within the next 16 hours can trigger assertion of the stream update descriptor. In other implementations, the TOI is configured as the timeframe between any two adjacent scheduled MPD updates. For example, if it is presently noon, and the television receiver is configured to automatically update its local MPD each morning at 04:00, the TOI can be the 24-hour period beginning 8 hours ago and continuing for the next 16 hours. In other implementations, the TOI is configured as the timeframe between a present time (or a last scheduled update time) and any set amount of time (e.g., any number of days, number of scheduled update periods, etc.) up to the end of the obtained MPD. For example, if the television receiver is configured automatically update its local MPD each morning at 04:00 with a nine-day window of EPG content, the TOI can be configured as any timeframe from now (or beginning eight hours ago) until nine days from now at 04:00.

At least one customer premises appliance 112 includes a local MPD engine 125. As described herein, embodiments of the local MPD engine 125 seeks to detect off-schedule updates to DVB SI, and to force an update to local MPD for customer premises devices 112 in accordance with the off-schedule update, where appropriate. Embodiments of the local MPD engine 125 can be configured to monitor SI for one or more services associated with MPD. For example, a particular television receiver may be configured to receive two-day EPG data on a first service, nine-day EPG data on a second service, and enhanced search information on a third service, and each service may have associated SI, such as associated service description tables (SDTs), event information tables (EITs), etc. The local MPD engine 125 can monitor any updates to the SI for those services to detect assertion of the stream update descriptor. In some embodiments, the stream update descriptor is only asserted if the update is considered to be a TOI update at the provider side. In other embodiments, the stream update descriptor is asserted at the provider side, and each television receiver detecting assertion of the stream update descriptor can determine whether the associated update should be considered a TOI update. In some such embodiments, the TOI is configurable at each television receiver. In some embodiments, there is a predefined limit on update frequency that is not to be exceeded. For example, it can be desirable to limit the maximum number of off-schedule MPD updates to two per day (or any other suitable number). As such, an SI update may not be considered as a TOI update (e.g., by the provider and/or by the television receiver), and/or may be otherwise ignored if the maximum number of daily off-schedule updates as already been met.

If the local MPD engine 125 detects an asserted stream update descriptor (and/or detects that the stream update descriptor is associated with a TOI update), the television receiver can be configured automatically to perform an off-schedule update (e.g., obtain, decode, and build) of its MPD. Embodiments can integrate the stream update descriptor into the SI in any suitable manner, in accordance with applicable standards and/or specifications. The MPD format and content (e.g., and, thus, the manner of integration of the stream update descriptor) can vary according to the broadcast standard being employed to transmit the data, the standard of SI used, and/or other parameters. Some embodiments implement the stream update descriptor in the SI of a DVB transport stream (TS) in accordance with technical specifications of applicable DVB standards, such as those promulgated by the European Telecommunications Standards Institute (ETSI). For example, embodiments can incorporate the stream update descriptor in one or more DVB SI tables, such as, but not limited to, a NIT (Network Information Table), a SDT (Service Description Table), an EIT (Event Information Table), a BAT (Bouquet Association Table), a SIT (Selection Information Table), a RST (Running Status Table), a TOT (Time Offset Table), and/or a TDT (Time and Date Table). However, embodiments described herein can be adapted to other standards, such as those promulgated by the Japanese Integrated Services Digital Broadcasting (ISDB), the North American Advance Television Systems Committee (ATSC), and/or others. For example, in various implementations, the novel stream update descriptor described herein can be inserted into, embedded in, or included with one or more of a video stream, audio stream, metadata stream, closed captioning stream, etc. For example, the stream update descriptor can be included in one or more MPEG PSI (Program Specific Information) tables, such as, but not limited to, a PAT (Program Association Table), a PMT (Program Map Table), a CAT (Conditional Access Table), a TSDT (Transport Stream Description Table), and/or Private Sections. Alternatively, the stream update descriptor can be included in one or more ASTC (Advanced Television Systems Committee) PSIP (Program and System Information Protocol) tables, such as, but not limited to, a STT (System Time Table), a RRT (Rating Region Table), a DCCT (Directed Channel Change Table), a MGT (Master Guide Table), a DCCSCT (Directed Channel Change Select Code Table), an ETT (Extended Text Table), an EIT (Event Information Table), a CVCT (Cable Virtual Channel Table), and/or a TVCT (Terrestrial Virtual Channel Table). In other embodiments, the stream update descriptor can be communicated to the television receiver in other manners, such as by a separate transmission of information.

As noted above, DVB SI typically provides data to support identification of services and events for a user. In the ETSI-promulgated standard, the DVB SI is structured as nine tables: a Bouquet Association Table (BAT); a Service Description Table (SDT); an Event Information Table (EIT); a Running Status Table (RST); a Time and Date Table (TDT); a Time Offset Table (TOT); a Stuffing Table (ST); a Selection Information Table (SIT); and a Discontinuity Information Table (DIT). The information transmitted by these SI tables is given by so-called "descriptors." Each descriptor starts with a "descriptor-tag", which can uniquely identify the type of descriptor, and a "descriptor-length." Different descriptors are used to describe information carried by different SI tables. The SI used by DVB standards tends to increase the amount of metadata that can accompany a particular television program and/or stream, and thereby can increase the amounts and/or types of data that can be included in the MPD for populating EPG interfaces, search interfaces, extended program information interfaces, etc. For example, a short event descriptor (in the EIT) can provide a data field containing the name of a program along with a short description of the program in text form, and one or more extended event descriptors (also in the EIT) can provide detailed text descriptions of the program. In some such SI standards, text information can be structured into columns, such as one indicating a field (e.g., an item description field, a data field, etc.), and another providing accompanying data in text format associated with the field. For example, the fields can indicate information, such as program title, starring actors, director, program category, etc.

In some embodiments, the stream update descriptor is implemented in the SI as a user-defined descriptor added to the Event Information Table (EIT), for example into the EIT p/f actual or EIT p/f other tables. Details of EIT can be found in the ETSI European Standard, telecommunications series (EN) 300 468, which is hereby incorporated by reference. For example, descriptors with tags in the user defined range of 0x80 to 0xFE can be used. In some embodiments, the stream update descriptor is said to be actuated by being present in the EIT. For example, presence of a new available provider version of the EIT causes the local MPD engine 125 to build a new local version of the EIT (as part of building a new local version of the SDT), in connection with which the local MPD engine 125 detects presence in the new EIT of the stream update descriptor. In response to detecting presence of the stream update descriptor in the EIT, the local MPD engine 125 is configured automatically to obtain (or schedule to obtain) updated MPD. In other embodiments, the stream update descriptor is said to be actuated when a variable state of the stream update descriptor indicates that it is actuated. For example, the stream update descriptor includes a field (e.g., "TOI update") and accompanying text (e.g., any suitable text to differentiate between actuated and not actuated, such as "TRUE" or "FALSE"; "1" or "0"; "ACTUATED" or "NOT ACTUATED"; "YES" or "NO"; etc.).

When the local MPD engine 125 builds a new local version of the EIT (e.g., responsive to presence of a new available provider version of the EIT), it can detect the indicated state of the stream update descriptor, and can automatically obtain (or schedule to obtain) updated MPD, accordingly. In other embodiments, the stream update descriptor indicates an update time, and/or other information (e.g., an identifier of an updated content stream, an identifier of an updated event, an identifier of an event type of the updated event, etc.). As one example, the local MPD engine 125 can be configured automatically to obtain (or schedule to obtain) updated MPD whenever locally cached EIT data is older than the update time indicated by the stream update descriptor text. As another example, the local MPD engine 125 can be configured automatically to obtain (or schedule to obtain) updated MPD only when the event, stream, or event type indicated by the stream update descriptor text corresponds to programming that is likely to be viewed via an associated television receiver (e.g., the MPD update is not forced to occur off-schedule for content streams to which the user is a subscriber, for event types the user does not tend to watch, etc.). Some embodiments permit the provider and/or the user to configure which types of events, which content streams, etc. will trigger off-schedule updates. For example, a user can interact with a settings interface to select options, such as "never perform off-schedule updates of EPG data," "only perform off-schedule EPG updates for the following channels: . . . ," "only perform off-schedule EPG updates for the following event types: . . . ," etc. In some implementations, a user can indicate a particular program, or set of programs, for which to force off-schedule MPD (and corresponding EPG) updates. For example, a user may use a settings interface to direct forcing of off-schedule MPD updates only for college basketball games, only for an upcoming State of the Union address, etc.

An example implementation of the stream update descriptor as integrated with the EIT of DVB SI can be as follows:

```
stream_update_descriptor( ) {
    descriptor_tag          8 uimsbf        value = 0xED
    descriptor_length       8 uimsbf        value = 8
    descriptor_subtag       16              value = 0x0103
    descriptor_number       4               value = 0
    last_descriptor_flag    1               value = 1
    descriptor_id           3               value = 0
    update_time             40 MJD+UTC
}
```

In some embodiments, implementation of the stream update descriptor involves activity both on the provider and consumer sides of the network. As illustrated in FIG. 1, in addition to the local MPD engine 125 at the customer premises, one or more service provider 102 nodes of the provider network 110 can include a provider MPD engine 115. Embodiments of the provider MPD engine 115 can detect an update to at least one of a number of DVB content services provided to customer premises appliances 112 by the DVB services provider via one or more DVB networks of the provider network 110. In response to such detecting, embodiments of the provider MPD engine 115 can update SI for any impacted DVB content service. For example, the SI can be updated based on a detected change in a scheduled start time for one or more programs, etc. As noted above, the SI can include the stream update descriptor, and updating the SI by the provider MPD engine 115 can include asserting the stream update descriptor in the SI. The provider MPD engine 115 can also update provider MPD based on the update to the at least one DVB content service.

The provider MPD engine 115 can direct broadcasting of the updated provider MPD via one or more MPD services of the DVB content services. For example, as described above, the service provider 102 (e.g., the provider MPD engine 115) can broadcast provider MPD to customer premises appliances 112 across some or all of its broadcast area over one or more broadcast channels, or other service channels. The broadcast provider MPD can include information that can be used by the customer premises appliances 112 to build their respective local data tables for populating EPG interfaces, search interfaces, etc. As noted above, some embodiments determine a set of upcoming program event timings (e.g., broadcast start times, end times, etc.) impacted by the update to the DVB content service(s), and the provider MPD engine 115 asserts the stream update descriptor in the SI only when at least one of the set of upcoming program event timings is prior to the next pre-scheduled MPD update time. For example, some implementations only force an off-schedule update to the MPD only if there is at least one impacted schedule change that will occur prior to a next time the MPD is already scheduled for updating. Similarly, some embodiments determine whether a number of times the stream update descriptor has been asserted since a last pre-scheduled MPD update has reached a predetermined threshold MPD update frequency, and the provider MPD engine 115 asserts the stream update descriptor in the SI only when the predetermined threshold MPD update frequency has not yet been reached since the last pre-scheduled MPD update. For example, an implementation may only permit a maximum of two off-schedule updates to the MPD between every pre-scheduled update to the MPD.

The updated SI and provider MPD are broadcast to customers via the provider network 110 and can be received by customer premises appliances 112. Turning the perspective to any particular customer premises appliance 112 that includes an instance of the local MPD engine 125, the local MPD engine 125 can detect an update to the SI for the at least one DVB content service being provided via the provider network 110. For example, the SI includes a version identifier, the update at the service provider 102 caused a version roll (i.e., a sequential or other update to the version identifier), and the local MPD engine 125 detects an update to the SI by detecting the version roll. Having detected the SI update, the local MPD engine 125 can determine that the stream update descriptor in the SI has been asserted.

Responsive to determining that the stream update descriptor in the SI has been asserted the local MPD engine 125 can execute an off-schedule MPD update. Such an off-schedule MPD update can include assigning a tuner of one or more customer premises appliances to obtain the updated provider MPD via the MPD service of the provider network 110 (i.e., as is being broadcast by the service provider 102). The local MPD engine 125 can rebuild local MPD based on the updated provider MPD. The local MPD can be stored local to the customer premises appliance 112 (e.g., in a local memory of the customer premises appliance 112, or in a storage accessible to the customer premises appliance 112) in a manner that is usable by the customer premises appliance 112 to populate a meta-programming user interface by which to display descriptive information about at least some of the DVB content services. For example, the meta-programming user interface can be used to display an electronic guide interface, a search interface, etc.

In some embodiments, an off-schedule MPD update can trigger additional operations at the customer premises appliances 112. One such operation is for the customer premises appliances 112 to download EPG guide data, search data, and/or additional descriptive data about content offerings for some or all streams (e.g., for all live linear OTT channels) from identified sources of such descriptive data (e.g., under the direction of the local MPD engine 125). For example, some such information can be retrieved from one or more other streams, from the Internet, etc. Another such operation is for a customer premises appliance 112 to generate a database (e.g., a structured query language (SQL) database)

and/or related scripts (e.g., one or more JavaScript Object Notation (JSON) files) containing all downloaded events and/or descriptive information. Another such operation is for the customer premises appliance 112 to rebuild daily schedule timers. For example, the stream updates can impact timing and/or other characteristics of pre-set recording timers, such that it is desirable to rebuild some or all such timers to ensure they are operating in accordance with updated information.

Figure 2:
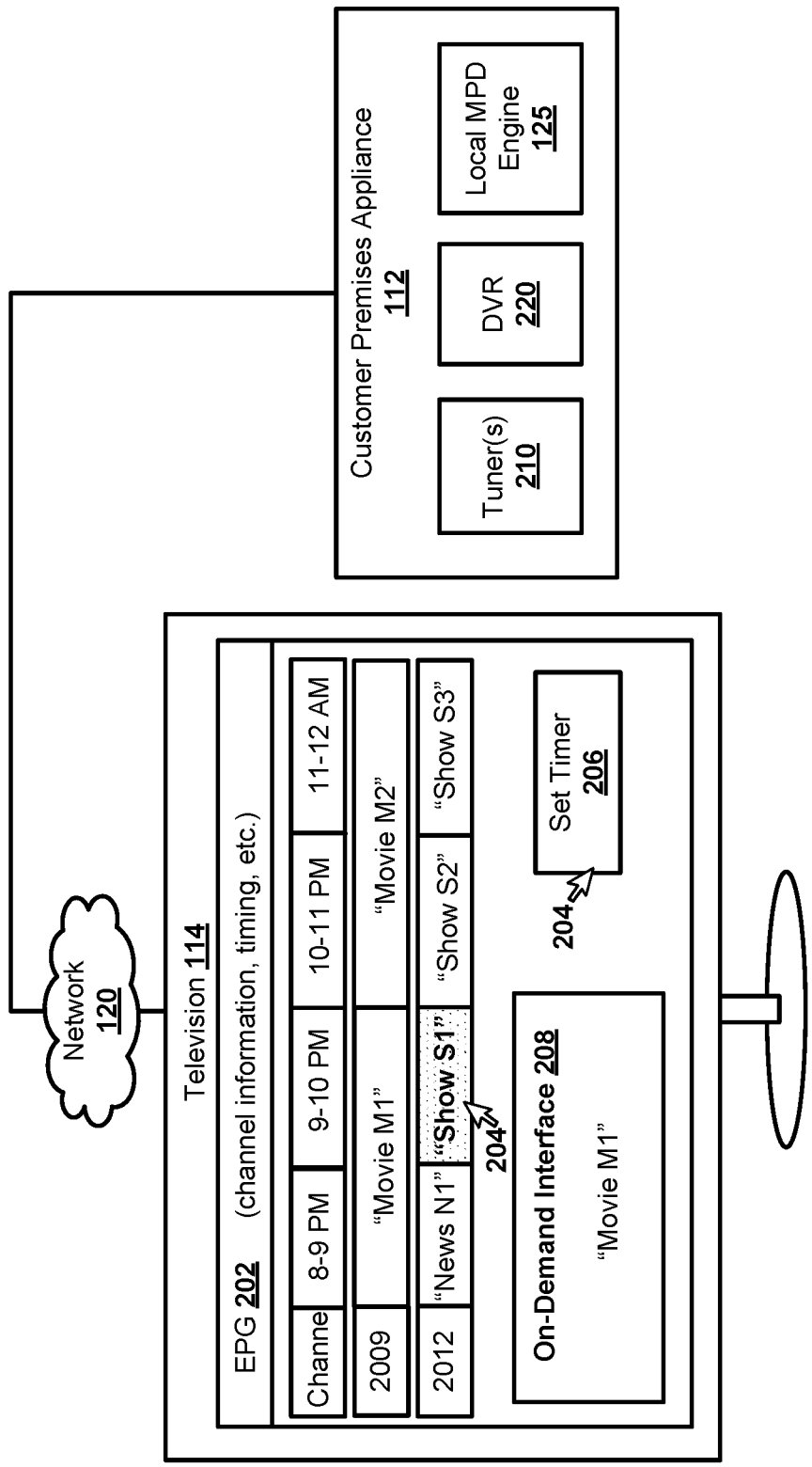
FIG. 2 shows an example of a meta-programming user interface built using local meta-programming data (MPD) by, or under direction of, a local MPD engine, according to embodiments described herein.

FIG. 2 shows an example of a meta-programming user interface built using local MPD by, or under direction of, a local MPD engine 125, according to embodiments described herein. In particular, a customer premises appliance 112 is illustrated as in communication with a television 114 via a local network 120 (e.g., as described with reference to FIG. 1). The customer premises appliance 112 is illustrated as including a local MPD engine 125, one or more tuners 210, and (optionally) a digital video recorder (DVR) 220. The DVR 220 can include any suitable type of data storage. The customer premises appliance 112 outputs an EPG (Electronic Programming Guide) 202 for presentation by the television 114. The EPG 202 presents various descriptive information related to DVB content streams, such as programming available on particular television channels received via the provider network 110, timing of those programs, etc. For example, the EPG 202 may display channel information associated with a channel "2012," where a "Show S1" is listed as scheduled to appear on the channel "2012" during a particular time period "9-10 PM" of a particular day, etc.

In this example, and assuming that a current time is some time during the time period "9-10 PM" of a particular day, a user may manipulate a cursor 204 using a pointing device (not shown) to select the "Show S1" for immediate viewing on the television 114. Other embodiments are possible. For example, it is envisioned that any means consistent with menu-driven navigation may be used to interact with the EPG 202, and respective elements of the EPG 202. The EPG 202 may further display or otherwise present a first user-selectable icon 206 that may be selected to set a recording timer to automatically record a particular program for later viewing. In this example, the DVR 220 of the customer premises appliance 112 can record programs or programming appearing on various channels as received from satellites 106. For example, and assuming that a current time is some time prior the time period "9-10 PM," such as a current time within the time period "8-9 PM" preceding the "9-10 PM" time period, a user may manipulate the cursor 204 to select the "Show S1" as displayed within the EPG 202 for recording by the customer premises appliance 112 for later viewing one or more of the televisions 114 (and/or computing devices 116, etc., as in FIG. 1).

Some embodiments of the customer premises appliance 112 include a single tuner 210. In such embodiments, at any particular time, the single tuner 210 is either in use (e.g., to watch programming via a DVB content service, to record live programming via a DVB content service, etc.), or idle. In other embodiments, the customer premises appliance 112 includes multiple tuners 210. In such embodiments, at any particular time, each tuner 210 can independently be in use or idle. For example, a first tuner 210 can be presently in use to receive and "Show S1" on channel "2012" for output to the television 114 (i.e., for viewing), while a second tuner 210 is presently in use to receive and record "Movie M1" on channel "2009" by a digital video recorded storage of the customer premises appliance 112, and while one or more additional tuners 210 remain idle. Some embodiments of the customer premises appliance 112 permit tuners 210 to be scheduled automatically to tune to a particular channel at a particular time for display and/or recording of programming being provided via the particular channel at the particular time.

As described herein, if the local MPD engine 125 detects an asserted stream update descriptor (and/or detects that the stream update descriptor is associated with a TOI update), the customer premises appliance 112 can be configured automatically to perform an off-schedule update (e.g., obtain, decode, and build) of its MPD. Some embodiments are configured to avoid interfering with present television viewing and/or present recording of television content. In some such embodiments, the automatic off-schedule MPD update is performed immediately only if at least one tuner 210 is presently available. If a tuner 210 is not presently available (e.g., all tuners 210 are currently in use for viewing and/or recording), the off-schedule update can be scheduled to be performed as soon as a tuner 210 becomes available, for a time when a tuner 210 is likely to be available, etc. In some such implementations, a tuner 210 is considered to be "in use" only when it is actually being used at the present moment. In other such implementations, a tuner 210 is considered to be "in use" when it is actually being used at the present moment, or is scheduled or predicted to be in use within a predefined amount of time from present (e.g., if a tuner 210 is scheduled for recording anytime in the next few minutes, etc.).

Figure 3:
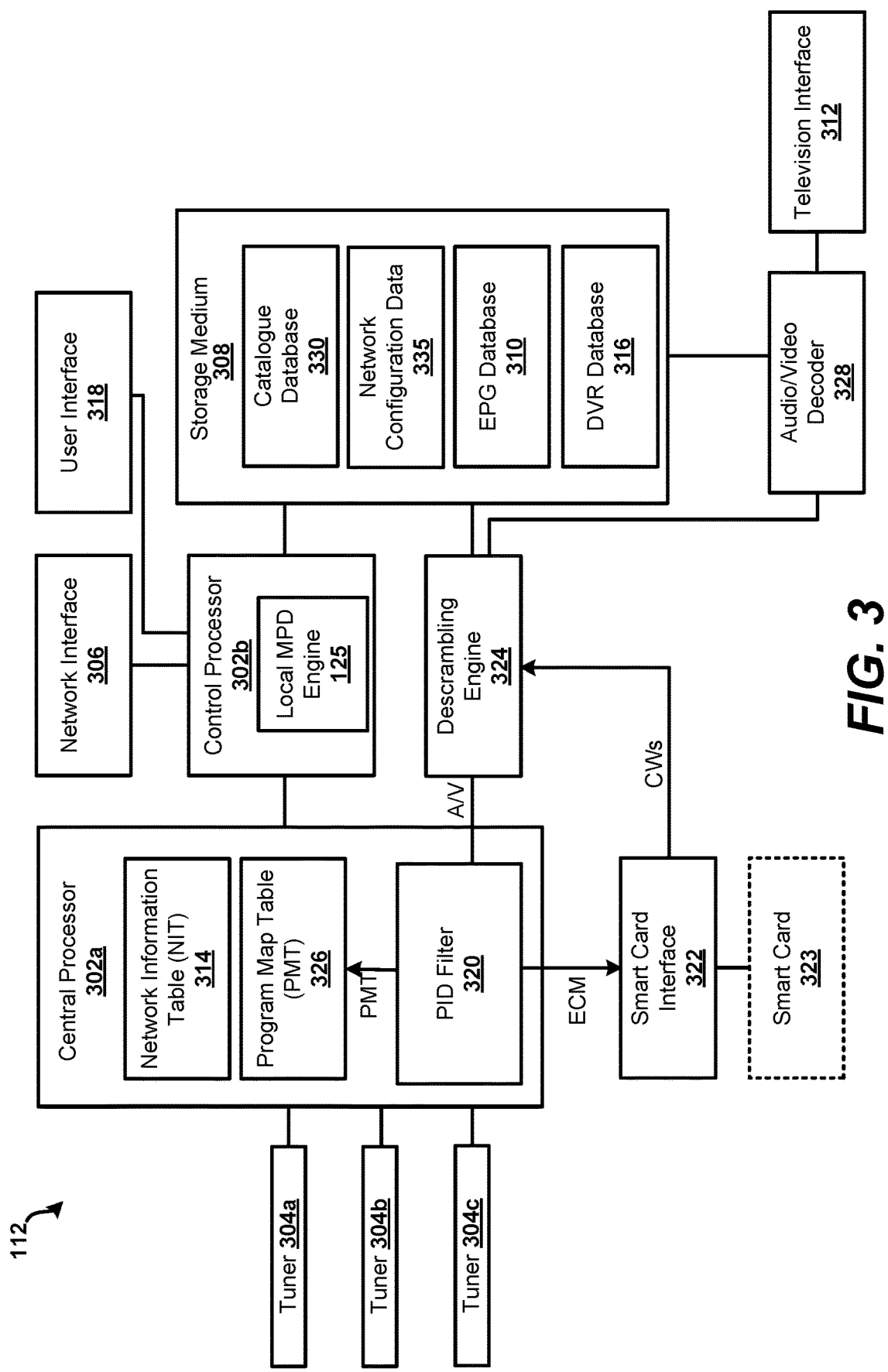
FIG. 3 shows a block diagram of an illustrative customer premises appliance, according to various embodiments described herein.

FIG. 3 shows a block diagram of an illustrative customer premises appliance 112, according to various embodiments described herein. As described above, the customer premises appliance 112 can be implemented as a television receiver, a set-top box, a computer, an Internet appliance (e.g., a router), and/or in any suitable appliance or other form. In some embodiments, each of the customer premises appliances 112 of FIG. 1 could be implemented similarly to the block diagram of FIG. 3. In other embodiments, various functional components can be distributed among multiple customer premises appliances 112, each customer premises appliance 112 can have more or fewer components, etc. In some embodiments, one (or fewer than all) of the customer premises appliances 112 is implemented similarly to the block diagram of FIG. 3, and one or more other customer premises appliances 112 can be implemented as a "thin client," or in any other suitable manner. In some embodiments, though not explicitly shown, one or more customer premises appliances 112 can include logical modules to implement a television steaming media functionality that encodes video into a particular format for transmission over the Internet, such as to allow users to remotely view and control a home cable, satellite, or personal video recorder system from an Internet-enabled computer with a broadband Internet connection. The Slingbox® by Sling Media, Inc. of Foster City, CA, is one example of a product that implements such a functionality. Additionally, each customer premises appliance 112 can include any number of other various components or logical modules that are implemented in hardware, software, firmware, or any combination thereof, and such components or logical modules may or may not be implementation-specific.

As illustrated, the customer premises appliance 112 can generally include one or more tuners 304, one or more processors 302, one or more interfaces (e.g., network interface 306, user interface 318, television interface 312, smart card interface 322, etc.), a storage medium 308 (e.g., including any suitable non-transient data storage media), and/or additional functional components (e.g., decoders 328, a descrambling engine 324, the local MPD engine 125, a PID packet identifier (PID) filter 320, etc.). The user interface 318 can include (and/or support communications with) remote control devices, physical interface controls (e.g., buttons, touch screens, etc.) of the customer premises appliance 112, and/or any other user interface components. The user interface 318 may be used to select a television channel for viewing, view information from the EPG database 310, and/or program a timer stored to the DVR database 316 wherein the timer may be used to control the DVR functionality of the control processor 302*b*. The storage medium 308 (or other components) can have any suitable data stored thereon, such as at least one EPG database 310, television interface 312, NIT (Networking Information Table) 314, DVR database 316, a catalogue database 330, PMT (Program Map Table) 326, network configuration datasets 335, etc. Components can be combined, separated, distributed, etc. in any suitable manner. For example, the descrambling engine 324 is illustrated as a separate component in the illustrated implementation, but other implementations can implement the descrambling engine 324 as a component of the control processor 302*b*.

Embodiments of the processor(s) 302 can include one or more specialized and/or general-purpose processors configured to perform any processes to support operation of the customer premises appliance 112, such as tuning to a particular channel, accessing and displaying EPG information from the EPG database 310, and/or receiving and processing input from a user via the user interface 318. For example, processor 302 may include one or more processors dedicated to decoding video signals from a particular format, such as MPEG (Moving Picture Experts Group), for output and display on a television and for performing decryption. In some embodiments, the processor 302 includes a central processor 302*a* in communication with a control processor 302*b*. For example, the central processor 302*a* can be a primary processor (e.g., a general purpose central processing unit) to direct lower-level operations of other processors, other hardware components, etc.; while the control processor 302*b* can be configured to control particular functions of the customer premises appliance 112 (e.g., as a dedicated processor or processors).

Some embodiments of the control processor 302*b* can control recording of television channels based on timers stored in the DVR database 316. The control processor 302*b* may initiate recording of a television channel by sending a record command along with an indication of the television channel to be recorded to the central processor 302*a*. The control processor 302*b* may not send a second record command, when additional recording is to begin at the same time, until an acknowledgement that recording of the first television channel has successfully been received and initiated by the central processor 302*a*. The control processor 302*b* may also provide commands to the central processor 302*a* when recording of a television channel is to cease. In addition to providing commands relating to the recording of television channels, the control processor 302*b* may provide commands to the central processor 302*a* that indicate television channels to be output to the decoder 328 for output to a presentation device, such as to a television via the television interface 312.

The decoder(s) 328 may serve to convert encoded video and audio into a format suitable for output to a display device. For instance, decoder 328 may receive MPEG video and audio from the storage medium 308, or the descrambling engine 324, to be output to a television. MPEG video and audio from the storage medium 308 may have been recorded to the DVR database 316 as part of a previously-recorded television program. The decoder 328 may convert the MPEG video and audio into a format appropriate to be displayed by a television or other form of display device and audio into a format appropriate to be output from speakers, respectively. All the output can be provided to presentation devices (e.g., a television) via the television interface 312. The television interface 312 may serve to output a signal to a television, or another form of display device, in a proper format for display of video and playback of audio. As such, the television interface 312 may output one or more television channels, stored television programming from the storage medium 308, such as television programs from the DVR database 316 and/or information from the EPG database 310 for example, to a television for presentation. Though described as a television interface 312, the interface can generally be configured for output to any one or more suitable presentation devices (e.g., televisions, home theater systems, projectors, computers, monitors, etc.).

The tuners 304 are used to tune to television channels, such as television channels transmitted via satellite or cable (e.g., satellites 106 of FIG. 1). Each tuner 304 can receive and process a single stream of data from a satellite transponder, from a cable RF channel, etc. at any given time. Additionally, one tuner (e.g., tuner 304*a*) may be used to tune to a television channel on a first transponder stream for display using a television, while another tuner (e.g., tuner 304*b*) may be used to tune to a television channel on a second transponder for recording and viewing at some other time. Still another tuner (e.g., tuner 304*c*) may be used to check various television channels to determine if they are available or not. If multiple television channels transmitted on the same transponder stream are desired, a particular tuner (e.g., tuner 304*a*) may be used to receive the signal containing the multiple television channels for presentation and/or recording. The tuners 304 may receive commands from the central processor 302*a*. Such commands may instruct the tuners 304 which frequencies are to be used for tuning.

The network interface 306 may be used to communicate via an alternate communication channel with a television service provider (e.g., service provider 102). For example, the primary communication channel may be via satellite, which may be unidirectional to the customer premises appliance 112; and an alternate communication channel, which may be bi-directional, may be via a network, such as the Internet. In such a configuration, the customer premises appliance 112 may be able to communicate with the service provider 102 via the provider network 110 (if bidirectional), and/or via a different network, such as the Internet. Alternately, the different network can be included as part of the provider network 110, such that the provider network 110 includes multiple network options.

Certain component architectures can support various additional features, such as isolation and/or grouping of components for added efficiency, added security, etc. For example, in the illustrated embodiment, the PID filter 320 is implemented by the central processor 302*a*, and the PMT 326 and NIT 314 are stored on-board the central processor 302*a*. Further, the central processor 302*a* is coupled with the tuner(s) 304, an inserted smart card 323 (via the smart card interface 322), the descrambling engine 324, and the control processor 302*b*. As such, the central processor 302*a* can, itself, perform functions involved with receiving a DVB content stream (e.g., a transport stream) via the tuner(s) 304. The central processor can then use the PID filter 320 to obtain the PID, indicating what information is contained in the transport stream, and to either decode or discard the transport stream based on the PID. If the transport stream is decoded, the central processor 302a (e.g., the PID filter 320) can provide information to support subsequent operations, such as providing program map table information to the PMT 326, providing audiovisual (A/V) data to the descrambling engine 324, and providing entitlement control messages (ECM) to the smart card 323 from which to generate control words (CWs) for use by the descrambling engine 324 in descrambling the A/V data. In some embodiments, the network configuration data 335 can include a conditional access table (CAT), which can facilitate decryption/descrambling of AV content using the smart card 323 (or any other suitable security device of the customer premises appliance 112), according to whether streams of television programming are permitted to the customer premises appliance 112.

Network configuration data 335 can include any suitable configuration datasets, such as various tables and/or other types of data defined according to applicable DVB standards and/or other standards. Some such network configuration data 335 is globally applicable to all customer premises appliances 112, while other such data is specifically included, omitted, and/or modified for each particular customer premises appliance 112 (e.g., according to a customer's subscriptions, authorizations, etc.). In some embodiments, network configuration data 335 includes the NIT 314 (e.g., even though illustrated in FIG. 3 as separate components stored at separate locations). The NIT 314 can store information about a service provider network (e.g., provider network 110 of FIG. 1). For example, the NIT 314 can indicate television channel numbers, satellite identifiers (which may be used to ensure different satellites are tuned to for reception of timing signals), frequency identifiers and/or transponder identifiers for various television channels, etc. In some embodiments, the NIT 314 contains additional data or additional tables that may be stored by the customer premises appliance 112.

Embodiments of the network configuration data 335 also include a service description table (SDT). An SDT may be transmitted on all transponders of the satellite-based service provider network, and can indicate a transport stream identifier, a service identifier, an indication of whether or not program schedules are included in the transport stream, an indication of whether or not information about current and/or upcoming programs is included in the transport stream, an operation status of the service (e.g., starting soon, running, paused, off-the-air), and an indication of whether or not the service is scrambled, etc. As described herein, in some implementations, the SDT can include a stream update descriptor to indicate whether provider MPD has been updated.

Network configuration data 335 can also include an event information table (EIT). The EIT provides information, which may be in chronological order, regarding events within a service, such as program titles and other EPG data (e.g., scheduled time period, scheduled channel). Multiple EITs may be used. For instance, an EIT may provide present/following (P/F) programming information (that is, information on television programs currently being broadcast on television channels and scheduled to be broadcast next on each channel) for various television channels, another EIT may provide two day programming information (programming information on television channels to be broadcast over the next two days), and another EIT may provide 9 day programming information (or some other number of days). The P/F programming information may be on all transponder streams (also referred to as transport streams), the 2 day EIT may be on one transponder (possibly per satellite) and the 9 day EIT may be on a single transponder available to a television receiver. EITs may be further broken down according to whether the data within an EIT is for television channels of the transport stream (transponder stream) currently tuned to or for other transport streams and as to whether the contained data is information about programming or programming schedule information. For instance, four separate table identifiers may be used for EITs that indicate: present/following event information for the currently tuned to transport stream; present/following event information for other transport streams; event schedule information for the currently tuned to transport stream; and event schedule information for other transport streams. As described herein, in some implementations, the EIT can include a stream update descriptor to indicate whether provider MPD has been updated.

As illustrated, the control processor 302b can include the local MPD engine 125. As noted above, one feature of the local MPD engine 125 is to detect an update to the SI (e.g., to the network configuration data 335. For example, the SDT, EIT, or other tables can include a version identifier by which the local MPD engine 125 can detect that SI has been updated. In some embodiments, the local MPD engine 125 includes a configuration package engine. For instance, when an updated table, such as an updated NIT, SDT, EIT, and/or CAT, has been created and is being distributed via the provider network 110, the updated tables can also be provided to the configuration package engine. The configuration package engine can then create new, updated local network configuration datasets that are stored in network configuration datasets 335. In some embodiments, within the updated network configuration data 335 is an asserted stream update descriptor, which can trigger the customer premises appliance 112 to execute (e.g., for immediate performance, or scheduled for future performance) an off-schedule MPD update. For example, executing the off-schedule MPD update can include assigning a tuner 304 to obtain updated provider MPD via an MPD service of the plurality of DVB content services, and rebuilding local MPD based on the updated provider MPD. The local MPD can be stored local to the customer premises appliance 112 (e.g., in the storage medium 308) and usable by the customer premises appliance 112 to populate a meta-programming user interface by which to display descriptive information about at least some of the plurality of DVB content services. For example, some or all of the local MPD can be used to populate the EPG database 310, portions of the network configuration data 335, etc.

The EPG database 310 may store information related to television channels and the timing of programs appearing on such television channels. Information from the EPG database 310 may be used to inform users of what television channels or programs are popular and/or provide recommendations to the user. The EPG database 310 may serve as an interface for a user to control DVR functions of the PTR 110, and/or to enable viewing and/or recording of multiple television channels simultaneously. Information from the EPG database 310 may provide the user with any suitable meta-programming user interface, such as EPG 202 of FIG. 2, and/or a search interface by which users can search for descriptive information relating to programming. Such interfaces can provide various interactive features, such as allowing a user to browse and select television channels and/or television programs for viewing and/or recording. Information used to populate the EPG database 310 may be received via the network interface 306 and/or via the tuners 304. For instance, updates to the EPG database 310 may be received periodically via one or more DVB services provided by one or more satellites of the provider network 110.

Embodiments of the customer premises appliance 112 can receive any suitable additional information from the service provider 102 via the provider network 110. For example, a formatted EPG table or database can be communicated to the customer premises appliance 112 via network interface 320. As another example, user preferences can also be transmitted to a customer premises appliance 112 (e.g., upon request) via network interface 320. Additionally or alternatively, software and/or firmware updates may be transmitted to a customer premises appliance 112 (e.g., on request) via network interface 320. In some embodiments, the network interface 320 and/or other components are configured to provide for bidirectional communications between the customer premises appliance 112 and the service provider 102. For example, embodiments of the control processor 302b can communicate with the network interface 306 and the user interface 318. In such embodiments, the control processor 302b can handle incoming data from the network interface 306 and the user interface 318, and/or the control processor 302b can output data via the network interface 306.

For simplicity, the customer premises appliance 112 is shown as a block diagram, and some common parts, such as a power supply, have been omitted. Further, some routing between various modules and components is illustrated, but such illustrated routings are for exemplary purposes only. For example, the state of two modules not being directly or indirectly connected does not indicate the modules cannot communicate. Components of the customer premises appliance 112 can be combined into a fewer number of modules, or divided into a greater number of modules. Further, some or all components of the customer premises appliance 112 can be part of one or more other devices, such as built into a television. Also, while the customer premises appliance 112 is described in context for a satellite network, similar components can be configured for use with other types of DVB network environments, such as a cable network.

Figure 4:
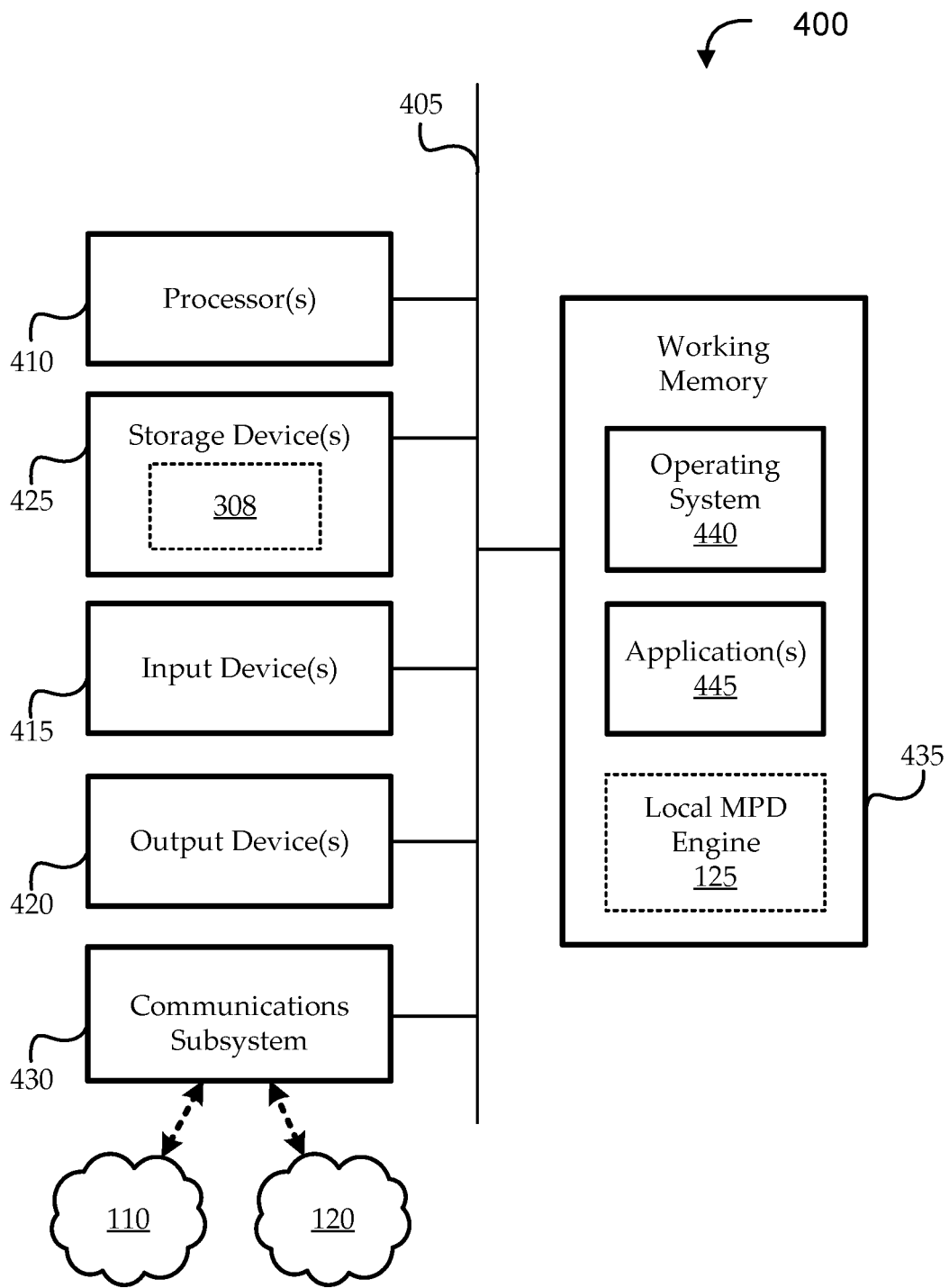
FIG. 4 provides a schematic illustration of one embodiment of a computer system that can implement various system components and/or perform various steps of methods provided by various embodiments.

Embodiments of the customer premises appliance 112, or components thereof, can be implemented on, and/or can incorporate, one or more computer systems, as illustrated in FIG. 4. FIG. 4 provides a schematic illustration of one embodiment of a computer system 400 that can implement various system components and/or perform various steps of methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown including hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, video decoders, and/or the like). For example, the processors can include the central processor 302a and/or control processor 302b of FIG. 3. The computer system 400 also includes one or more input devices 415, which can include, without limitation, a mouse, a keyboard, remote control, and/or the like; and one or more output devices 420, which can include, without limitation, a display device, a printer, and/or the like. In some implementations, the computer system 400 is a server computer configured to interface with additional computers (not with human users), such that the input devices 415 and/or output devices 420 include various physical and/or logical interfaces (e.g., ports, etc.) to facilitate computer-to-computer interaction and control.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 425 include the storage medium 308. For example, the storage devices 425 can store network configuration data 335, EPG databases 310, etc.

The computer system 400 can also include a communications subsystem 430, which can include, without limitation, a modem, a network card (wireless or wired), an infrared communication device, a wireless communication device, and/or a chipset (such as a Bluetooth™ device, an 402.11 device, a WiFi device, a WiMax device, cellular communication device, etc.), and/or the like. As described herein, the communications subsystem 430 supports multiple communication technologies. Further, as described herein, the communications subsystem 430 can provide communications with one or more communication networks, including one or more provider networks 110 and/or local networks 120 of FIG. 1.

In many embodiments, the computer system 400 will further include a working memory 435, which can include a RAM or ROM device, as described herein. The computer system 400 also can include software elements, shown as currently being located within the working memory 435, including an operating system 440, device drivers, executable libraries, and/or other code, such as one or more application programs 445, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods. In some embodiments, the operating system 440 and the working memory 435 are used in conjunction with the one or more processors 410 to implement some or all features of the local MPD engine 125.

A set of these instructions and/or codes can be stored on a non-transitory computer-readable storage medium, such as the non-transitory storage device(s) 425 described above. In some cases, the storage medium can be incorporated within a computer system, such as computer system 400. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 400 and/or can take the form of source and/or installable code, which, upon compilation and/or installation on the computer system 400 (e.g., using any of a variety of generally available compilers, installation programs, compression/decompression utilities, etc.), then takes the form of executable code. It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which can be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 can cause the processor(s) 410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media can be involved in providing instructions/code to processor(s) 410 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 400.

The communications subsystem 430 (and/or components thereof) generally will receive signals, and the bus 405 then can carry the signals (and/or the data, instructions, etc., carried by the signals) to the working memory 435, from which the processor(s) 410 retrieves and executes the instructions. The instructions received by the working memory 435 may optionally be stored on a non-transitory storage device 425 either before or after execution by the processor(s) 410.

It should further be understood that the components of computer system 400 can be distributed across a network. For example, some processing may be performed in one location using a first processor while other processing may be performed by another processor remote from the first processor. Other components of computer system 400 may be similarly distributed. As such, computer system 400 may be interpreted as a distributed computing system that performs processing in multiple locations. In some instances, computer system 400 may be interpreted as a single computing device, such as a distinct laptop, desktop computer, or the like, depending on the context.

Figure 5:
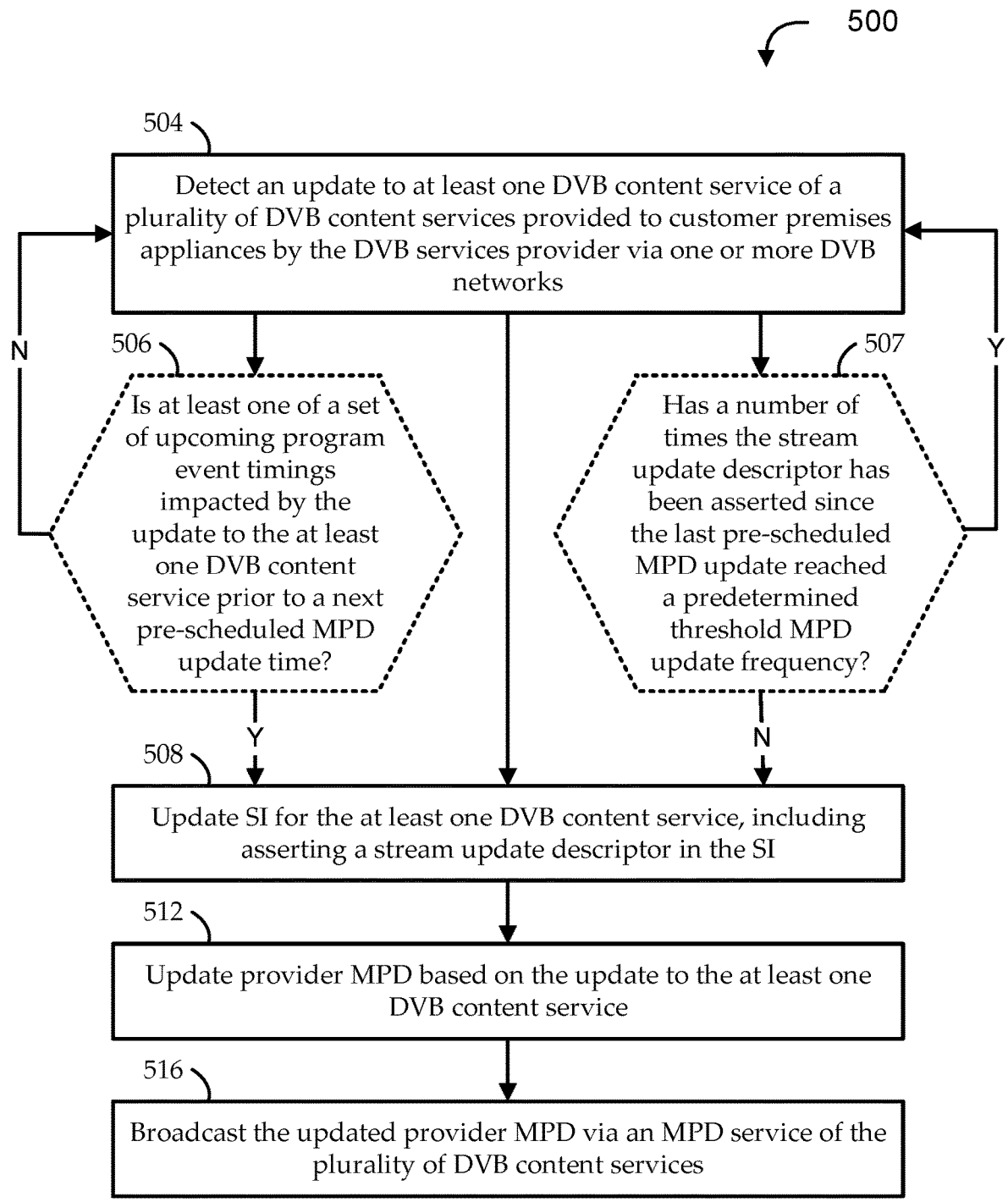
FIG. 5 shows a flow diagram of an illustrative provider-side method for forcing automatic off-schedule updating of MPD using digital video broadcast (DVB) service information (SI), according to various embodiments described herein.

Systems including those described above can be used to implement various methods. FIG. 5 shows a flow diagram of an illustrative provider-side method 500 for forcing automatic off-schedule updating of meta-programming data (MPD) using digital video broadcast (DVB) service information (SI), according to various embodiments described herein. Embodiments of the method 500 begin at stage 504 by detecting (e.g., by a provider-side node of a DVB services provider) an update to at least one of multiple DVB content services provided to customer premises appliances by the DVB services provider via one or more DVB networks.

At stage 508, embodiments can update SI for the at least one DVB content service (e.g., by the provider-side node) responsive to the detecting, including asserting a stream update descriptor in the SI. Some embodiments, at stage 506, further determine, responsive to the detecting, a set of upcoming program event timings impacted by the update to the at least one DVB content service. Such embodiments may only assert the stream update descriptor at stage 508 when it is determined that at least one of the set of upcoming program event timings is prior to a next pre-scheduled MPD update time. For example, the customer premises appliances 112 are configured automatically to look for a new update to provider MPD once per day at a particular time of day, which thereby defines the next pre-scheduled MPD update time. Other embodiments, at stage 507, further determine, responsive to the detecting, whether a number of times the stream update descriptor has been asserted since a last pre-scheduled MPD update has reached a predetermined threshold MPD update frequency. Such embodiments may only assert the stream update descriptor at stage 508 when it is determined that the number of times the stream update descriptor has been asserted since the last pre-scheduled MPD update has not reached a predetermined threshold MPD update frequency.

At stage 512, embodiments can update (e.g., by the provider-side node) provider MPD responsive to the detecting and based on the update to the at least one DVB content service. At stage 516, embodiments can broadcast the updated provider MPD via an MPD service of the multiple DVB content services. As described herein, detection of the asserted stream update descriptor by one of the customer premises appliance upon receipt by the customer premises appliance of the updated SI can force the customer premises appliance automatically to execute an off-schedule MPD update by assigning a tuner of the customer premises appliance to obtain the updated provider MPD via the MPD service and to rebuild local MPD of the customer premises appliance based on the updated provider MPD. The rebuilt local MPD is then usable by the customer premises appliance to populate a meta-programming user interface (e.g., an EPG interface) by which to display descriptive information about at least some of the plurality of DVB content services.

Figure 6:
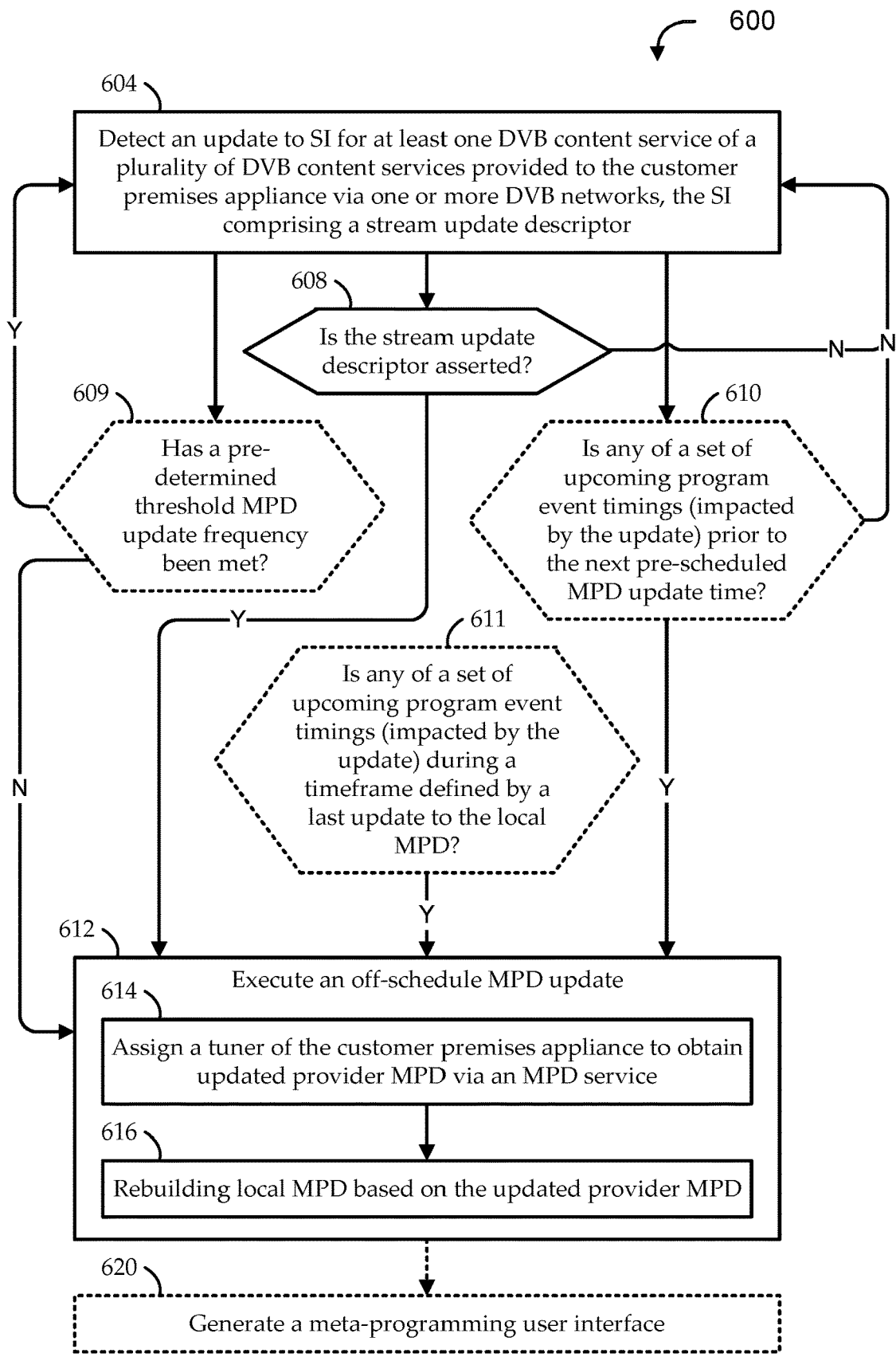
FIG. 6 shows a flow diagram of an illustrative subscriber-side method for forcing automatic updating of MPD using DVB SI, according to various embodiments described herein.

FIG. 6 shows a flow diagram of an illustrative subscriber-side method 600 for forcing automatic updating of meta-programming data (MPD) using digital video broadcast (DVB) service information (SI), according to various embodiments described herein. Embodiments of the method 600 begin at stage 604 by detecting (e.g., by a customer premises appliance) an update to SI for at least one DVB content service of a plurality of DVB content services provided to the customer premises appliance via one or more DVB networks, the SI comprising a stream update descriptor. For example, the updated SI is received after at least stage 508 of the method 500 of FIG. 5. In some embodiments, the SI includes a set of descriptor tables identified at least by version identifiers, and the detecting at stage 504 includes detecting a change in at least one of the version identifiers. At stage 608, embodiments can determine that the stream update descriptor is asserted. In some embodiments, the stream update descriptor is in a Service Description Table (SDT) and/or an Event Information Table (EIT) of the SI.

At stage 612, embodiments can execute, automatically responsive to the determining at stage 608, an off-schedule MPD update. For example, the off-schedule MPD update can include: at stage 614, assigning a tuner of the customer premises appliance to obtain updated provider MPD via an MPD service of the plurality of DVB content services; and at stage 616, rebuilding local MPD based on the updated provider MPD. As described herein, the local MPD can be stored local to the customer premises appliance and usable by the customer premises appliance to populate a meta-programming user interface by which to display descriptive information about at least some of the plurality of DVB content services.

In some embodiments, the customer premises appliance includes one or more tuners, and the executing at stage 612 includes: determining whether any of the set of tuners is presently idle; directing tuning of a particular tuner of the set of tuners presently to a channel associated with the MPD service responsive to determining that the particular tuner of the set of tuners is presently idle; and scheduling tuning of one of the set of tuners at a subsequent time to the channel associated with the MPD service responsive to determining that none of the set of tuners is presently idle. In some implementations, the scheduling includes determining the subsequent time as a designated time and scheduling the tuning of the one of the set of tuners at the designated time. In some implementations, the scheduling includes: monitoring at least the one of the set of tuners to detect when the at least one of the set of tuners becomes idle; and directing the tuning of the one of the set of tuners responsive to detecting that the at least one of the set of tuners has become idle.

Some embodiments only perform the executing at stage 612 under particular conditions. Some embodiments further include determining at stage 609, prior to the executing at stage 612, whether a pre-determined threshold MPD update frequency has been met; such that the executing at stage 612 is performed only when the predetermined threshold MPD update frequency has not been met. Some embodiments further include determining at stage 610, prior to the executing at stage 612, a set of upcoming program event timings impacted by the update to the at least one DVB content service; such that the executing at stage 612 is performed only in accordance with determining that at least one of the set of upcoming program event timings is prior to the next pre-scheduled MPD update time. In some embodiments, the local MPD includes the descriptive information about the at least some of the plurality of DVB content services for event timings occurring during a timeframe defined by a last update to the local MPD. Such embodiments can further include, at stage 611 prior to the executing at stage 612, determining a set of upcoming program event timings impacted by the update to the at least one DVB content service and determining whether any of the set of upcoming program event timings is during the timeframe; such that the executing at stage 612 is only performed in accordance with determining that at least one of the set of upcoming program event timings is during the timeframe.

Some embodiments of the method 600 further include generating the meta-programming user interface at stage 620 for output to a display device in communication with the customer premises appliance. In some embodiments, the meta-programming user interface is generated as an electronic program guide interface populated with the descriptive information about the at least some of the plurality of DVB content services in accordance with the rebuilt local MPD. In other embodiments, the meta-programming user interface is generated as a program search interface by which to provide, responsive to user search queries, portions of the descriptive information about the at least some of the plurality of DVB content services in accordance with the rebuilt local MPD.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for forcing automatic updating of meta-programming data using digital video broadcast (DVB) service information (SI), the method comprising:
   detecting an update to SI for at least one DVB content service of a plurality of DVB content services provided to the customer premises appliance via one or more DVB networks, the SI comprising a stream update descriptor;
   determining that the stream update descriptor is asserted;
   determining a set of upcoming program event timings impacted by the update to the at least one DVB content service and whether any of the set of upcoming program event timings is prior to a next pre-scheduled MPD update time; and
   executing, automatically responsive to the determining that the stream update descriptor is asserted and that at least one of the set of upcoming program event timings is prior to the next pre-scheduled MPD update time, an off-schedule meta-programming data (MPD) update at least by:
      assigning a tuner of a customer premises appliance to obtain updated provider MPD via an MPD service of the plurality of DVB content services; and
      rebuilding local MPD based on the updated provider MPD, the local MPD stored local to the customer premises appliance and usable by the customer premises appliance to populate a meta-programming user interface by which to display descriptive information about at least some of the plurality of DVB content services.

2. The method of claim 1, wherein:
the customer premises appliance comprises a set of tuners including the tuner; and
the executing comprises:
   determining whether any of the set of tuners is presently idle;
   directing tuning of a particular tuner of the set of tuners presently to a channel associated with the MPD service responsive to determining that the particular tuner of the set of tuners is presently idle; and
   scheduling tuning of one of the set of tuners at a subsequent time to the channel associated with the MPD service responsive to determining that none of the set of tuners is presently idle.

3. The method of claim 2, wherein:
the scheduling comprises determining the subsequent time as a designated time and scheduling the tuning of the one of the set of tuners at the designated time.

4. The method of claim 2, wherein the scheduling comprises:
   monitoring at least the one of the set of tuners to detect when the at least one of the set of tuners becomes idle; and
   directing the tuning of the one of the set of tuners responsive to detecting that the at least one of the set of tuners has become idle.

5. The method of claim 1, further comprising:
determining, prior to the executing, whether a pre-determined threshold MPD update frequency has been met, wherein the executing is performed only when the pre-determined threshold MPD update frequency has not been met.

6. The method of claim 1, wherein:
the local MPD includes the descriptive information about the at least some of the plurality of DVB content services for event timings occurring during a timeframe defined by a last update to the local MPD and the next pre-scheduled MPD update time; and
the determining whether any of the set of upcoming program event timings is prior to a next pre-scheduled MPD update time comprises determining whether any of the set of upcoming program event timings is in the timeframe according to the descriptive information.

7. The method of claim 1, wherein:
the stream update descriptor is in a Service Description Table (SDT) and/or an Event Information Table (EIT) of the SI.

8. The method of claim 1, wherein:
the SI comprises a set of descriptor tables identified at least by version identifiers; and
the detecting comprises detecting a change in at least one of the version identifiers.

9. The method of claim 1, further comprising:
generating, by the customer premises appliance for output to a display device in communication with the customer premises appliance, an electronic program guide interface populated with the descriptive information about the at least some of the plurality of DVB content services in accordance with the rebuilt local MPD.

10. The method of claim 1, further comprising:
generating, by the customer premises appliance for output to a display device in communication with the customer premises appliance, a program search interface by which to provide, responsive to user search queries, portions of the descriptive information about the at least some of the plurality of DVB content services in accordance with the rebuilt local MPD.

11. A customer premises appliance comprising:
one or more processors;
a non-transient storage subsystem having, stored thereon:
   local meta-programming data (MPD) usable by the customer premises appliance to populate a meta-programming user interface by which to display descriptive information about at least some of a plurality of digital video broadcast (DVB) content services provided to the customer premises appliance via one or more DVB networks; and
   processor-readable instructions, which, when executed by the one or more processors, cause the one or more processor to perform steps comprising:
      detecting an update to service information (SI) for at least one DVB content service of the plurality of DVB content services, the SI comprising a stream update descriptor;
      determining that the stream update descriptor is asserted;
      determining a set of upcoming program event timings impacted by the update to the at least one DVB content service and whether any of the set of upcoming program event timings is prior to a next pre-scheduled MPD update time; and executing, by the customer premises appliance automatically responsive to the determining that the stream update descriptor is asserted and that at least one of the set of upcoming program event timings is prior to the next pre-scheduled MPD update time, an off-schedule MPD update at least by assigning a tuner of one or more tuners to obtain updated provider MPD via an MPD service of the plurality of DVB content services, and rebuilding local MPD based on the updated provider MPD.

12. The customer premises appliance of claim 11, further comprising:

the one or more tuners to be selectively tuned to any of a plurality of channels, each corresponding to a respective one of the plurality of DVB content services.

13. The customer premises appliance of claim 12, wherein:

the executing comprises:

determining whether any of the one or more tuners is presently idle;

directing tuning of a particular tuner of the one or more tuners presently to a channel associated with the MPD service responsive to determining that the particular tuner is presently idle; and scheduling tuning of one of the one or more tuners at a subsequent time to the channel associated with the MPD service responsive to determining that none of the one or more tuners is presently idle.

14. The customer premises appliance of claim 13, wherein:

the scheduling comprises determining the subsequent time as a designated time and scheduling the tuning of the one of the one or more tuners at the designated time.

15. The customer premises appliance of claim 13, wherein the scheduling comprises:

monitoring at least the one of the one or more tuners to detect when the at least one of the one or more tuners becomes idle; and directing the tuning of the one of the one or more tuners responsive to detecting that the at least one of the one or more tuners has become idle.

16. The customer premises appliance of claim 11, wherein the processor-readable instructions, when executed by the one or more processors, cause the one or more processor to perform steps further comprising:

determining, prior to the executing, whether a pre-determined threshold MPD update frequency has been met, wherein the executing is performed only when the pre-determined threshold MPD update frequency has not been met.

17. The customer premises appliance of claim 11, wherein:

the local MPD includes the descriptive information about the at least some of the plurality of DVB content services for event timings occurring during a timeframe defined by a last update to the local MPD and the next pre-scheduled MPD update time; and the determining whether any of the set of upcoming program event timings is prior to a next pre-scheduled MPD update time comprises determining whether any of the set of upcoming program event timings is in the timeframe according to the descriptive information.

18. The customer premises appliance of claim 11, further comprising:

a display interface to couple with a display appliance, wherein the processor-readable instructions, when executed by the one or more processors, cause the one or more processor to perform steps further comprising outputting the meta-programming user interface to the display appliance in accordance with the rebuilt local MPD.

19. The customer premises appliance of claim 18, wherein:

wherein the outputting the meta-programming user interface comprises generating and outputting an electronic program guide interface and populating the electronic program guide interface with the descriptive information about the at least some of the plurality of DVB content services in accordance with the rebuilt local MPD.

20. The customer premises appliance of claim 18, wherein the outputting the meta-programming user interface comprises:

generating and outputting a program search interface;

receiving a user search query via the program search interface;

generating a search result responsive to the user search query, based on the rebuilt local MPD; and populating the program search interface with the search result.

* * * * *